United States Patent
Badenhorst

(10) Patent No.: US 9,549,322 B2
(45) Date of Patent: Jan. 17, 2017

(54) METHODS AND SYSTEMS FOR AUTHENTICATION OF A COMMUNICATION DEVICE

(71) Applicant: Cornelius Johannes Badenhorst, Eversdal (ZA)

(72) Inventor: Cornelius Johannes Badenhorst, Eversdal (ZA)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/721,940

(22) Filed: May 26, 2015

(65) Prior Publication Data

US 2015/0365827 A1    Dec. 17, 2015

(30) Foreign Application Priority Data

Jun. 11, 2014   (ZA) .................. 2014/04289

(51) Int. Cl.
   *H04M 1/66*   (2006.01)
   *H04W 12/06*  (2009.01)
   *H04L 29/06*  (2006.01)

(52) U.S. Cl.
   CPC .......... *H04W 12/06* (2013.01); *H04L 63/0876* (2013.01)

(58) Field of Classification Search
   CPC .................................... H04W 12/06
   USPC ........................................ 455/411
   See application file for complete search history.

(56) References Cited

U.S. PATENT DOCUMENTS

| 8,213,907 | B2* | 7/2012 | Etchegoyen | 455/411 |
|---|---|---|---|---|
| 8,726,407 | B2* | 5/2014 | Etchegoyen | 726/34 |
| 8,862,097 | B2* | 10/2014 | Brand et al. | 455/411 |
| 2005/0144482 | A1* | 6/2005 | Anuszewski | 713/201 |
| 2005/0149740 | A1 | 7/2005 | Kotzin et al. | |
| 2006/0136992 | A1* | 6/2006 | Shigeeda | 726/2 |
| 2007/0236330 | A1 | 10/2007 | Cho et al. | |
| 2008/0091453 | A1* | 4/2008 | Meehan et al. | 705/1 |
| 2009/0112814 | A1* | 4/2009 | Statia et al. | 707/3 |
| 2011/0093703 | A1 | 4/2011 | Etchegoyen | |
| 2013/0007848 | A1* | 1/2013 | Chaskar et al. | 726/4 |
| 2013/0218772 | A1 | 8/2013 | Manessis et al. | |

(Continued)

OTHER PUBLICATIONS

Kount Certainty Ahead, "Multi-Layer Device Fingerprinting", 2011, 2 pages.

(Continued)

*Primary Examiner* — Santiago Garcia
(74) *Attorney, Agent, or Firm* — Kilpatrick Townsend & Stockton LLP

(57) ABSTRACT

A method and system are provided for authenticating a communication device. The method conducted at a remote server includes the steps of: receiving, from a communication device via a first communication channel, a fingerprint identifying the communication device and a value of a parameter of the communication device specific to the communication device and variable over time; determining whether the value is within a predicted range; and if the value is not within the predicted range or the predicted range has not been established, sending an additional authentication request via a second communication channel. The predicted range is learnt over a given number of interactions between the communication device and the remote server and an expected rate of change of the value.

23 Claims, 9 Drawing Sheets

(56) References Cited

U.S. PATENT DOCUMENTS

2014/0084133 A1   3/2014  Weigmann et al.
2014/0101740 A1*  4/2014  Li et al. ............................ 726/7
2014/0123255 A1   5/2014  Etchegoyen
2014/0270415 A1*  9/2014  Alameh et al. ............... 382/124

OTHER PUBLICATIONS

International Search Report and Written Opinion mailed Oct. 1, 2015 in PCT/IB2015/053955, 12 pages.

\* cited by examiner

METHODS AND SYSTEMS FOR AUTHENTICATION OF A COMMUNICATION DEVICE

CROSS-REFERENCE TO RELATED APPLICATIONS

This application claims priority to South African provisional patent application number 2014/04289 filed on 11 Jun. 2014, which is incorporated by reference herein.

FIELD OF THE INVENTION

This invention relates to methods and systems for authentication of a communication device.

BACKGROUND TO THE INVENTION

Use of mobile communication devices is very widespread and security of information stored on or accessed by a mobile communication device is an important issue.

Many mobile communication devices include secure elements, for example in the form of a hardware security module, built into the mobile communication device or attachable to the mobile communication device, such as via the subscriber identity module (SIM) card. The secure element may store secure details such as payment card details and may control the security and access to the payment card details, for example, for use with Near Field Communication (NFC) payment implementations.

Mobile communication devices may communicate with a remote server in carrying out secure transactions instead of using a device-based secure element. An example of this is host card emulation (HCE) where, instead of the mobile communication device using a secure element on the mobile device to store payment card details, the payment card details are stored in a cloud-based secure server. An application on the mobile communication device then makes a request to the cloud-based secure server for card details to be presented to a point of sale device.

In order to avoid hacking of the payment process, the mobile communication device must identify itself securely to the cloud-based secure server to ensure that the request for payment card details is valid. In order to not negatively impact the user experience, this is aimed to be done without user input.

Device fingerprinting technology is a known method of identifying a mobile communication device to a remote server. Active fingerprinting uses the installation of executable code directly on a device which has access to identifiers assigned to the device hardware, such as the International Mobile Station Equipment Identity (IMEI) or the media access control (MAC) address. The executable code uses an algorithm, with inputs of an identifier to generate the fingerprint. The remote server knows how the fingerprint is generated by the device and can therefore identify the device.

Fingerprinting technology may result in breaches of security as a hacker may be able to obtain the executable code and reverse engineer it and may try to access a remote server storing card credentials by imitating the mobile communication device.

There is a need in the art to address the aforementioned and other problems.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to a first aspect of the present invention there is provided a method for authenticating a communication device, the method being conducted at a remote server and comprising the steps of:

receiving, from a communication device via a first communication channel, a fingerprint identifying the communication device and a value of a parameter of the communication device specific to the communication device and variable over time;

extracting the identity of the communication device and obtaining a predicted range of the value of the parameter for the identified communication device at the time of receipt of the value;

determining whether the received value is within the predicted range; and if the value is not within the predicted range or the predicted range has not been established, sending an additional authentication request to the identified communication device via a second communication channel.

The predicted range may be learnt over a given number of interactions between the communication device and the remote server and an expected rate of change of the value may be established.

Further features provide for the predicted range to be obtained from a third party server which may store a corresponding parameter to the parameter of the communication device.

The step of sending an additional authentication request may also include: transmitting a code to the communication device over the second communication channel using a communication number obtained during a registration procedure of the communication device; receiving the code from the communication device; and authenticating the communication device. The additional authentication request may also include a header for identifying the additional authentication request at the communication device for automatic processing.

Further features provide for the second communication channel to use a communication number obtained during a registration procedure of the communication device. For example, this may be the USISDN number of the communication device.

In one embodiment, more than one value is received from the communication device and the method may include: determining whether each value is within a predicted range for that value; and if a predefined number of the values are within their predicted ranges, authenticating the communication device.

The fingerprint identifying the communication device may be generated by an algorithm known to the communication device and the remote server which incorporates an identification number of the communication device. For example, the identification number may be an IMEI or MAC address.

Further features provide for the method to include a registration procedure comprising the steps of: obtaining a communication number for the communication device; recording an identification number for the communication device and a fingerprinting method; and receiving at least one current value of a parameter and a timestamp for the value.

The method may further include: receiving an updated value at an elapsed time period from the last recorded value; and calculating an updated rate of change of the value; updating the predicted range of the value over time.

According to a second aspect of the present invention there is provided a method for authenticating a communication device, the method being conducted at a communication device and comprising the steps of:

retrieving a value of a parameter at a given time from a component of the communication device, wherein the parameter is specific to the communication device and variable over time;

sending, to a remote server via a first communication channel, a fingerprint identifying the communication device and the value of the parameter at the given time;

the remote server determining whether the value is within a predicted range; and if the value is not within the predicted range or the predicted range has not been established, the communication device:

receiving an additional authentication request at the communication device via a second communication channel.

Further features provide for the method to include retrieving and sending a value of more than one parameter.

Additional features of the method may include receiving an additional authentication request and determining if an authentication procedure is in progress in the communication device; if an authentication procedure is in progress, returning a response to the additional authentication request to the remote server.

The method may also include identifying a header in an additional authentication request and automatically processing the additional authentication request.

The method may also include: monitoring access to data of parameters of the communication device used for the value; detecting any suspicious access; and taking an action.

According to a third aspect of the present invention there is provided a system for authenticating a communication device, comprising a remote server including:

an authentication procedure component including: a receiving component for receiving, from a communication device via a first communication channel, a fingerprint identifying the communication device and a value of a parameter of the communication device specific to the communication device and variable over time;

an identity extracting component for extracting the identity of the communication device and obtaining a predicted range of the value of the parameter for the identified communication device at the time of receipt of the value;

a parameter value checking component for determining whether the received value is within the predicted range; and an additional verification component for: if the value is not within the predicted range or the predicted range has not been established, sending an additional authentication request to the identified communication device via a second communication channel.

Further features provides for the predicted range to be learnt by a predictable range component over a given number of interactions between the communication device and the remote server and an expected rate of change of the value may be established.

Further features provides for a retrieving parameter from third party component to obtain the predicted range from a third party server which may store a corresponding parameter to the parameter of the communication device.

The additional verification component may also include a message component for sending an additional authentication request including a code to the communication device over the second communication channel using a communication number obtained during a registration procedure of the communication device, and receiving the code from the communication device.

The authentication procedure component may also include: a fingerprint component for generating a fingerprint by an algorithm known to the communication device and the remote server which may incorporate an identification number of the communication device.

The remote server may also include a registration component including: a communication number component for obtaining a communication number for the communication device; a record component for recording an identification number for the communication device and a fingerprinting method and receiving at least one current value of a parameter and a timestamp for the value.

The registration component may also include an update component for: receiving an updated value at an elapsed time period from the last recorded value; and calculating an updated rate of change of the value; updating the predicted range of the value over time.

According to a fourth aspect of the present invention there is provided a system for authenticating a communication device with a remote server, comprising a communication device including:

an authentication procedure component including:

a parameter value obtaining component for retrieving a value of a parameter at a given time from the communication device, wherein the parameter is specific to the communication device and variable over time;

a message component for sending, to a remote server via a first communication channel, a fingerprint identifying the communication device and the value of the parameter at the given time; the remote server determining whether the value is within a predicted range; and if the value is not within the predicted range or the predicted range has not been established, the communication device:

receiving an additional authentication request at the communication device via a second communication channel.

Further features provides for the parameter value obtaining component to retrieve and send a value of more than one parameter.

The communication device may additionally include an additional authentication component for receiving an additional authentication request and determining if an authentication procedure is in progress in the communication device; if an authentication procedure is in progress, returning a response to the additional authentication request to the remote server.

The communication device may also include: an alert component having: a monitoring component for monitoring access to data of parameters of the communication device used for the value and detecting any suspicious access; and an action component for taking an action.

According to a fifth aspect of the present invention there is provided a computer program product authenticating a communication device, the computer program product executable at a remote server comprising a computer-readable medium having stored computer-readable program code for performing the steps of:

receiving, from a communication device via a first communication channel, a fingerprint identifying the communication device and a value of a parameter of the communication device specific to the communication device and variable over time;

extracting the identity of the communication device and obtaining a predicted range of the value of the parameter for the identified communication device at the time of receipt of the value;

determining whether the received value is within the predicted range; and if the value is not within the predicted range or the predicted range has not been established, sending an additional authentication request to the identified communication device via a second communication channel.

According to a sixth aspect of the present invention there is provided a computer program product authenticating a communication device, the computer program product executable at a communication device comprising a computer-readable medium having stored computer-readable program code for performing the steps of:

retrieving a value of a parameter at a given time from a component of the communication device, wherein the parameter is specific to the communication device and variable over time;

sending, to a remote server via a first communication channel, a fingerprint identifying the communication device and the value of the parameter at the given time;

the remote server determining whether the value is within a predicted range; and if the value is not within the predicted range or the predicted range has not been established, the communication device:

receiving an additional authentication request at the communication device via a second communication channel

BRIEF DESCRIPTION OF THE DRAWINGS

The invention will now be described, by way of example only, with reference to the accompanying representations in which.

DETAILED DESCRIPTION

Embodiments of the described method and system are provided for identification and authentication of a communication device when interacting with a remote server. Although embodiments are described with interaction between a communication device and a remote server, it is envisaged that the methods at the remote service may be divided across two or more servers, for example using a messaging server, or registration server.

Systems and methods are described in which communication from a valid communication device may be authenticated using information provided from the device in addition to a fingerprint generated by a known fingerprint technology for identification of the device. The additional information may be based on variable, device-specific parameters on the communication device. The variable, device-specific parameters change with time in a predictable manner and therefore, a value provided as the additional information can be determined to be in an acceptable, predicted range if it is genuine. If the value is not in the predicted range, then an out of band authentication may be used to authenticate the communication device.

The term communication device is used and refers to any device, which may be mobile or static, which has communication capabilities with a remote server. Some examples include mobile smart phones, mobile feature phones, tablets, personal computers, etc. Although particularly envisaged to be used with mobile communication devices, specifically with NFC capabilities for making payments, the described method may also be applicable to static communication devices.

The variable, device-specific parameters which may be used to generate values for the additional information may have unpredictable starting values but should vary over time at a predictable rate for a particular user. Example parameters may be: the number of applications installed on the device; the memory used on the device by the applications; the memory remaining on the device; the number of emails on the device or in an inbox on the device; the number of contacts on the device; the number of Short Message Service (SMS) messages on the device; the number of photographs on the device; the number of songs on the device, or a combination of any of the above. Any piece of information for which it is difficult to guess a starting value and does not change often in an unpredictable manner (e.g. if it changes it is typically in the same direction) may be used. The rate at which the value changes may be learnt over time for a particular user of a communication device.

Figure 1:
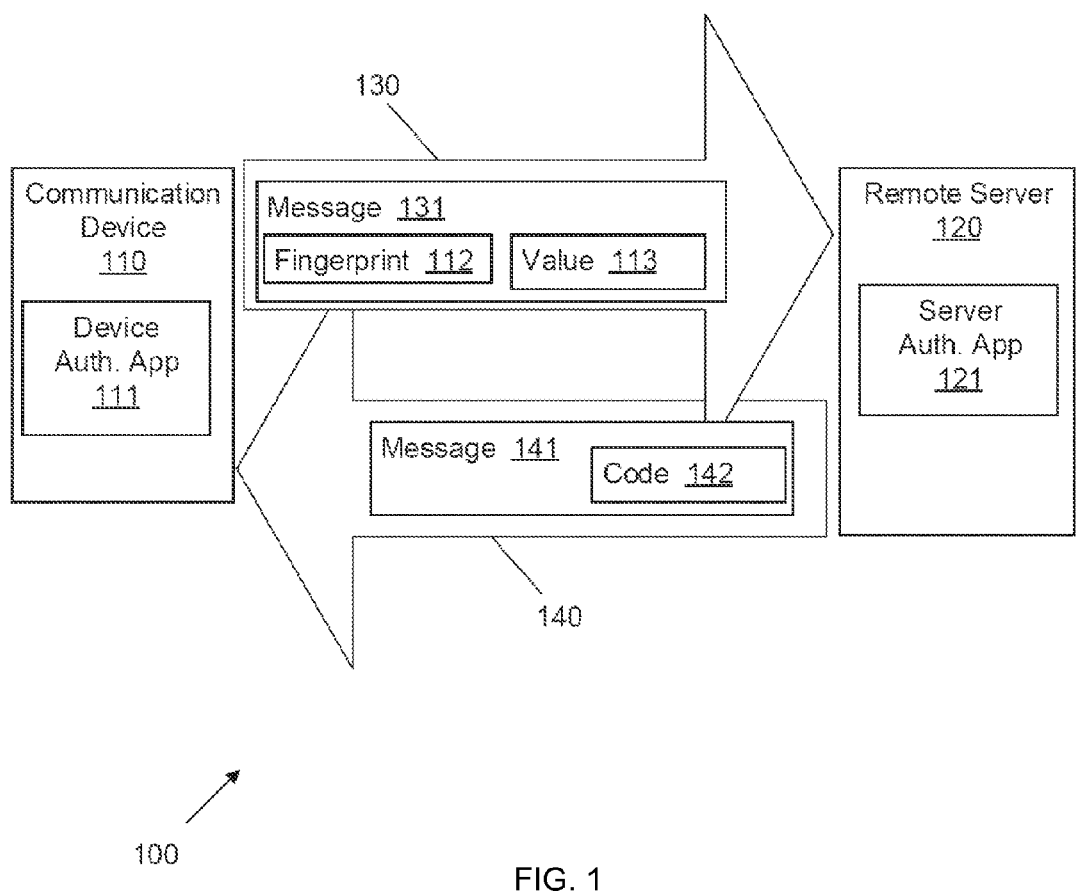
FIG. 1 is a schematic diagram of a method and system according to embodiments of the present invention.

Referring to FIG. 1, a schematic diagram (100) illustrates an embodiment of the described method and system.

A communication device (110) is provided which may wish to identify itself to a remote server (120), for example, in order to authorize transactions or access information.

In the described method and system, a first communication channel (130) is provided between the communication device (110) and the remote server (120), for example, in the form of a data channel.

The communication device (110) may include a device authentication application (111) with a corresponding server authentication application (121) on the remote server (120) for carrying out an authentication check of the communication device (110). The device authentication application (111) on the communication device (110) may be provided integrally with a service application for using a service of the remote server.

In some embodiments, an authentication application (111, 121) is resident only on the remote server (120) and accessed via an Unstructured Supplementary Service Data (USSD) bearer channel which opens a live connection between the communication device (110) and the remote server (120).

The device authentication application (111) may generate a fingerprint (112) based on an identification number such as a serial number of the communication device (110), for example, in the form of the IMEI or the MAC address of the device. The fingerprint (112) may be generated by known methods using an algorithm known to both the communication device (110) and the remote server (120). The fingerprint may be static for all interactions of the communication device (110) with the remote server (120) or may be dynamic and change with each interaction based on a varying algorithm or seed value.

The device authentication application (111) may also generate a value (113) based on at least one variable, device-specific parameter obtained from the communication device (110). The fingerprint (112) and the value (113) may be combined in a message (131) or sent consecutively to the remote server (120) via the first communication channel (130).

The remote server (120) may receive the message (131) and the server authentication application (121) may extract the fingerprint (112) and the value (113). The fingerprint (112) may be decoded by a corresponding algorithm at the remote server (120) and the identification number of the communication device (110) obtained. As an additional authentication check to make sure that the fingerprint came from the genuine device, the value (113) may be compared to a predicted range for the device-specific parameter for the identified communication device (110) as compared to a value provided at registration of the communication device (110). The value (113) may include one or more values of different device-specific parameters such that a user profile is provided and each of the values may be compared to predicted ranges for the relevant device-specific parameter.

If the value (113) does not fall within the predicted range or insufficient interactions with the communication device (110) have been carried out to learn the predicted range, a message (141) may be sent to the communication device (110) by a second communication channel (140), such as by Short Message Service (SMS), USSD channel, or other means. The remote server (120) may have obtained the Mobile Subscriber Integrated Services Digital Network-Number (MSISDN) for the communication device (110) during the registration procedure or this may have been provided at registration. The message (141) may include a code (142) for additional verification by the device authentication application (111) of the communication device (110).

The message (141) sent to the communication device (110) via the second communication channel (140) may include a header recognizable by the device authentication application (111) such that it can provide an automated response.

The device authentication application (111) may automatically determine if a current authentication operation is taking place and, if so, may confirm the code (142) back to the remote server (120). On the other hand, if no authentication operation is underway at the device, the authentication application (111) may issue an alert or may terminate the first communication channel (130) or may take other action.

This out of band verification via a second communication channel has the added advantage of verifying the correct communication number is being used by the communication device (110) and that the authentication operation has originated at the correct communication device (110).

The described functionality may be incorporated into an authentication application which may form part of a banking application or other transactional application provided on a communication device.

Figure 2:
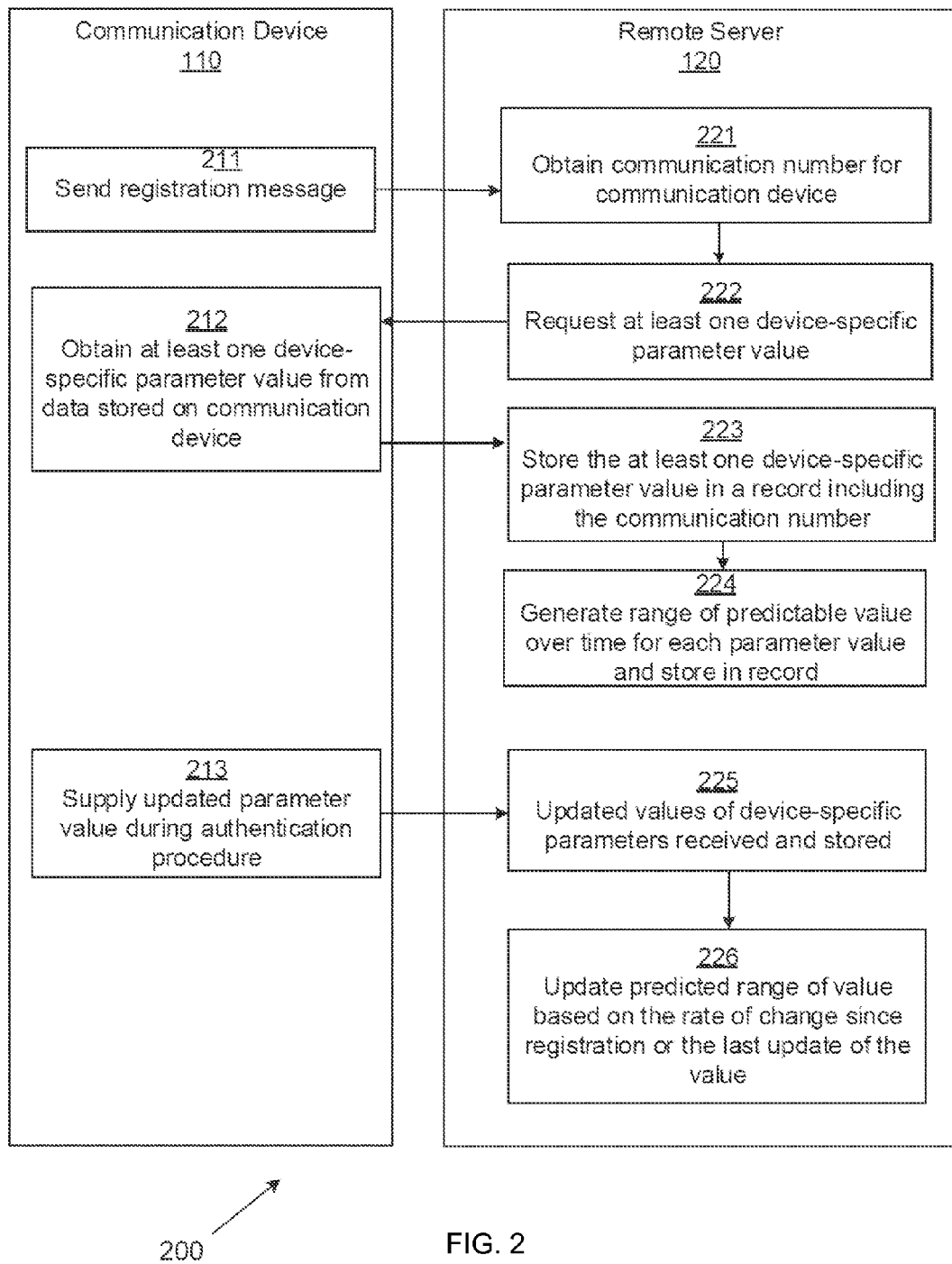
FIG. 2 is a flow diagram showing a method at a communication device and at a remote server according to an aspect of the present invention.

Referring to FIG. 2, a flow diagram (200) shows an embodiment of a first aspect of the described method of registration of a communication device (110) with a remote server (120).

A registration message may be sent (211) by the communication device (110) to the remote server (120). This may be via an USSD message which may enable the remote server (120) to obtain (221) the MSISDN for the communication device (110). Alternatively, this may be via a data channel communication and the communication number of the communication device (110) may be provided in the registration message.

The remote server (120) may request (222) at least one device-specific parameter value from the communication device (110). The communication device (110) may obtain (212) the at least one device-specific parameter value from the data stored on the device at the time of registration and may send this to the remote server (120). It is appreciated that the communication device (110) may continuously measure the at least one device-specific parameter value from the data stored on the device and may transmit to the remote server (120) at regular intervals or when in communication with the remote server (120) either in response to a request or independently of a request to do by the remote server (120).

The remote server (120) may store (223) the at least one device-specific parameter value in a record for the communication device (110). The record may also include the MSISDN or supplied communication number and a timestamp of registration.

The remote server (120) may generate (224) a range of predictable values over time since registration of the communication device (110) for each device-specific parameter value that has been provided by the communication device (110). The range of predictable values may be an acceptable variation or distribution from an exact predicted value. The predicted value may be based on an expected rate of change of the value over time. This may be initially estimated at the registration procedure.

During later communication between the communication device (110) and the remote server (120), an updated value may be supplied (213) by the communication device (110) and received (225) by the remote server (120) and the record may be updated to give the new value and the rate of change of the value may be updated (226) based on the rate of change in the value since the initial registration or last update of the value. In this way, due to the regular updating of the value, the predictable range may become more accurate for a given device.

If multiple device-specific parameter values are obtained and updated to obtain predicted rates of change, a device profile may be built with expected values of each of the device-specific parameters at a given time of a requested transaction.

Figure 3A:
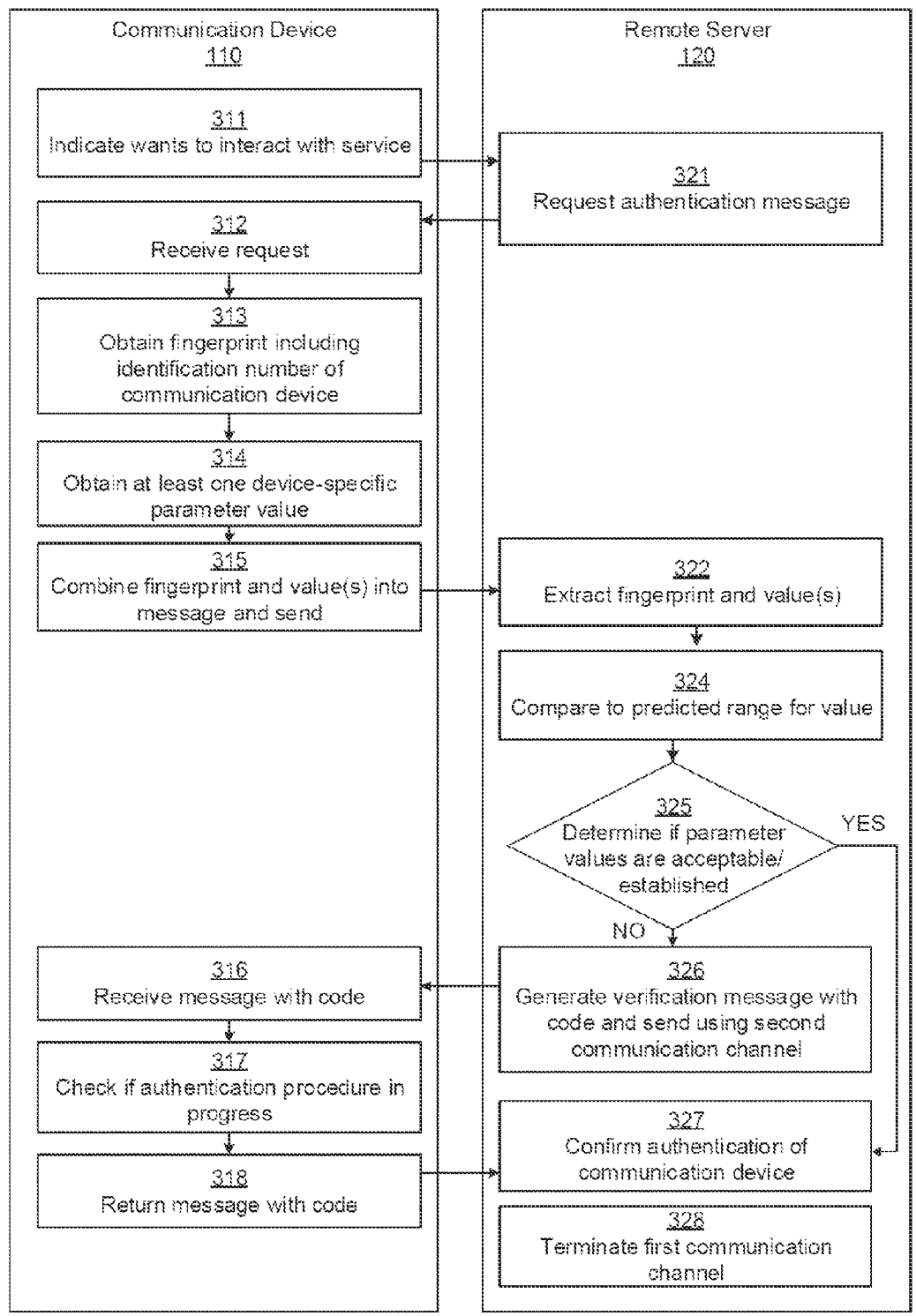
FIG. 3A is a flow diagram showing a method at a communication device and at a remote server according to an aspect of the present invention.

Referring to FIG. 3A, a flow diagram (300) shows an embodiment of a second aspect of the described method of authentication of a communication device (110) with a remote server (120).

A communication device (110) may indicate (311) to the remote server (120) that it wants to interact with a service provided by the remote server (120). For example, this might be to request or activate a transaction on a payment card stored at the remote server (120).

The remote server (120) may request (321) authentication of the communication device (110). This may be carried out via a first communication channel (130).

The communication device (110) may receive (312) the request and may obtain (313) a fingerprint including an identification number of the communication device (110) and may also obtain (314) at least one value of a device-specific parameter from the communication device (110).

The at least one device-specific parameter value may be combined (315) into a message with the obtained fingerprint. This may be done in a number of different ways. More than one value may be obtained and combined in a manner such that the remote server (120) may identify the parameters to be checked against. In addition, the value or values may be combined into the fingerprint or may be distinguished from the fingerprint in the message.

The message may be received at the remote server (120) which may extract (322) the fingerprint and the parameter values. The at least one parameter value may be identified and compared (324) with the predicted range for each parameter. The predicted range may be based on the registered value and the predicted rate of change to the current time of the authentication request. There may be some flexibility in the range and if more than one parameter value is sent, then a threshold number of the values meeting the predicted ranges may be predefined, for example, two out of three supplied values may be required to fall within the predicted ranges for the values.

It is determined (325) if the parameter value(s) are acceptable compared to the predicted range. If the parameter value(s) do not fall in the predicted range, or a sufficient number of the parameter value(s) do not fall in the predicted range, or if the predicted range has not yet been established for a communication device, the remote server (120) may generate (326) a verification message including a unique code, wherein the verification message is sent via a second communication channel to the communication device (110). The second communication channel may be an SMS channel using the communication device communication number obtained and recorded at the registration procedure.

The second channel verification message may be generated (326) for a given number of initial interactions with a communication device (110) in order to learn the rate of change of the parameter values for the communication device (110). For example, three interactions may be required to build up a rate of change.

The communication device (110) may receive (316) the message with the code via the second communication channel and may check (317) if an authentication process is in progress and, if so, may return (318) the code to the remote server (120). This check may be carried out automatically by an authentication application without any input by a user. The message may include a header recognizable by the authentication application in order that the message can be intercepted and responded to automatically. The additional verification makes sure that the authentication request has not come from someone else imitating the communication device (110) by checking that the communication device (110) is in fact in the process of carrying out an authentication procedure.

Furthermore, the additional verification uses a communication number (for example, the MSISDN) and ensures that the registered communication device (110) is being used with the registered communication number.

At the remote server (120), if it is determined (325) that the parameter value(s) are acceptable or an additional verification message is sent and the correct code received back, then the remote server (120) may confirm (327) the authentication of the communication device (110) and the required service can be commenced.

If the incorrect code, or no code is received back from the communication device (110) in a predefined timeframe, then the first communication channel is terminated and the required service is denied (328). An alert may be sent by the remote server (120) to the registered identification number of the communication device (110) in order to alert it to the fact that a malicious or suspicious attempt to use the fingerprint of the communication device has been received.

The entire authentication method may take place on the communication device (110) without the knowledge or input of a user.

In an example embodiment, the number of emails in a mailbox on the communication device is used as a device-specific parameter and it is assumed that the number of emails will typically increase at a fairly steady rate. When a first message from the communication device is sent to the remote server, the communication device may retrieve information regarding the number of emails and this number may be saved at the remote server. The number of emails may then always be sent in subsequent communications between the device and the remote server and the communications will be accepted as long as the number of emails increase at the steady rate. If the number of emails decreases or jumps by an unprecedented amount, it is likely that it is not the correct device that is sending the communication and that the accompanying fingerprint may have been created by a hacker.

Figure 3B:
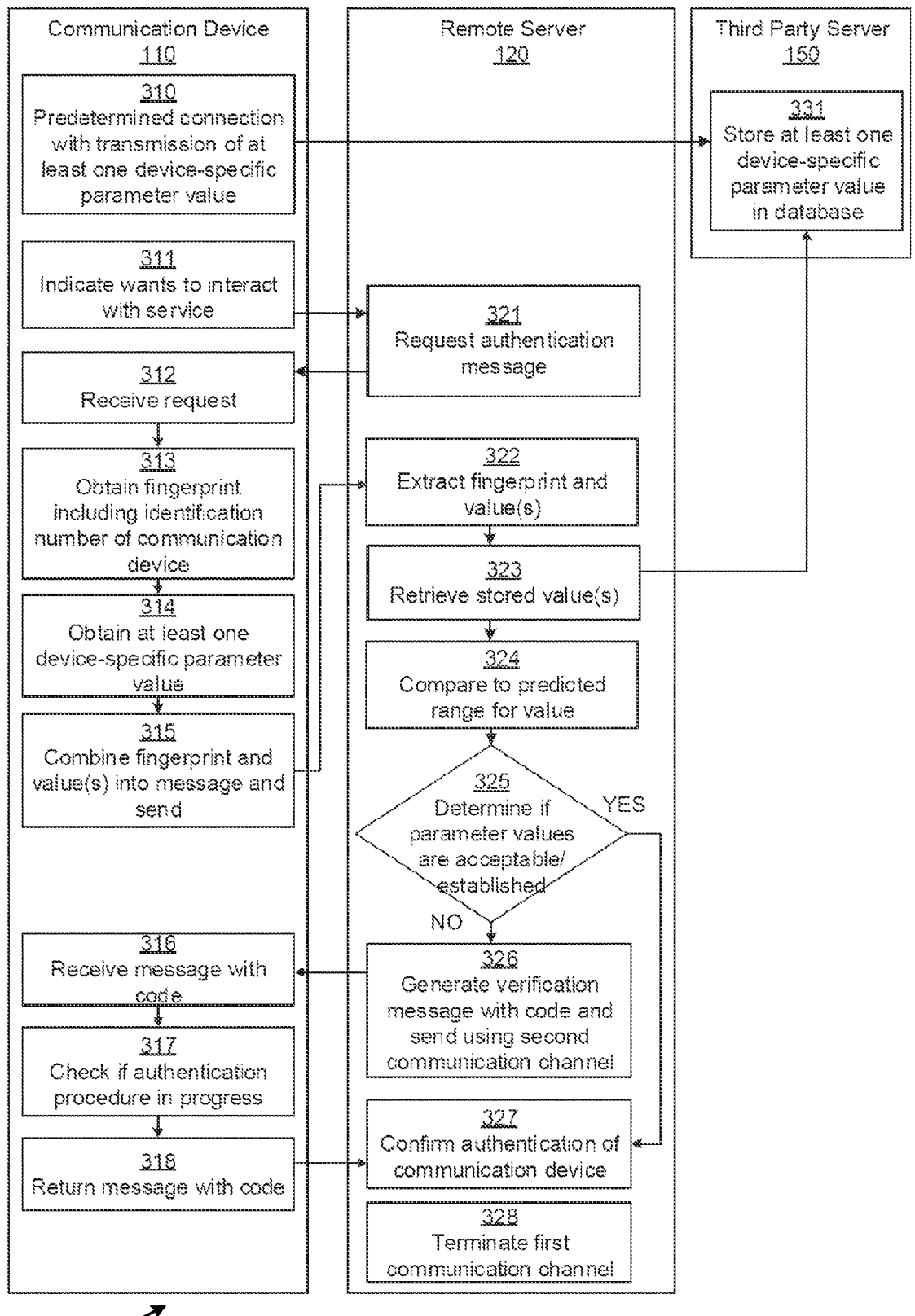
FIG. 3B is a flow diagram showing a method at a communication device and at a remote server according to an aspect of the present invention.

Referring to FIG. 3B, a flow diagram (301) shows another embodiment of the second aspect of the described method of authentication of a communication device (110) with a remote server (120).

The method comprises essentially the same steps as FIG. 3A, the steps of a communication device (110) which may indicate (311) to the remote server (120) that it wants to interact with a service provided by the remote server (120), the remote server (120) which may request (321) authentication of the communication device (110) which may be carried out via a first communication channel (130), the communication device (110) which may receive (312) the request and may obtain (313) a fingerprint including an identification number of the communication device (110), and may also obtain (314) at least one value of a device-specific parameter from the communication device (110), the at least one device-specific parameter value which may be combined (315) into a message with the obtained fingerprint and the message which may be received at the remote server (120) which extracts (322) the fingerprint and the parameter values.

The communication device (110) may have previously established a connection (310) with a third party server (150) such as an application server and at least one value of a device-specific parameter may have been transmitted from the communication device (110) to the third party server (150). For example, an application may run on the communication device (110) which communicates with the third party server (150) and the third party server (150) may store data relating to the use of the application by the communication device (110). The third party server (150) may have stored the at least one value of a device-specific parameter in a database (331) which may be retrieved (323) by the remote server (120) at the time of an authentication request.

The communication device (110) may transmit the value of a device-specific parameter to the third party server (150) whenever connection is made between the two. For example, if the application was a photograph sharing application, a record of the number of photographs could be stored in the application server which may then be retrieved by the remote server. The required permissions by the user for access of the application metadata or statistics from the third party server (150) would be required at registration with the remote server (120).

As an alternative to retrieving (323) the value of the device-specific parameter value from the third party server (150) during authentication, parameter values may be obtained by the remote server (120) from the third party server (150) at regular intervals to build a predicted rate of change of the parameter value at the remote server (120). During registration of the communication device (110) with the remote server (120) as described with reference to FIG. 2, the remote server (120) may obtain the at least one value of a device-specific parameter from the third party server (150) and may store the at least one device-specific parameter value in a record for the communication device (110). The remote server (120) may generate a range of predictable values over time for each device-specific parameter value that has been provided by the third party server (150) and may use said predicted value during authentication. It is appreciated that the remote server (120) may continuously or at regular intervals, obtain updates of the at least one device-specific parameter value from the data stored on the third party server (150) in order to determine a predicted rate of change and therefore a predicted value at a time of authentication. As mentioned earlier, the range of predictable values may be an acceptable variation or distribution from an exact predicted value. The predicted value may be based on an expected rate of change of the value over time.

The at least one parameter value obtained directly from the communication device (110), may then be compared with the predicted range for each parameter or with the retrieved value of the parameter retrieved from the third party server (150). As mentioned earlier, there may be some flexibility in the range and if more than one parameter value is sent, then a threshold number of the values meeting the predicted ranges may be predefined.

If the parameter value(s) do not fall in the predicted range, or a sufficient number of the parameter value(s) do not fall in the predicted range, or if the predicted range has not yet been established for a communication device, the remote server (120) may generate (326) a verification message including a unique code, wherein the verification message is sent via a second communication channel to the communication device (110). The communication device (110) may receive (316) the message with the code via the second communication channel and may check (317) if an authentication process is in progress and, if so, may return (318) the code to the remote server (120). As mentioned earlier, this check may be carried out automatically by an authentication application without any input by a user.

At the remote server (120), if it is determined (325) that the parameter value(s) are acceptable or an additional verification message is sent and the correct code received back, then the remote server (120) may confirm (327) the authentication of the communication device (110) and the required service can be commenced. Whereas, if the incorrect code, or no code is received back from the communication device (110) then the first communication channel is terminated and the required service is denied (328).

In an example embodiment, the number of photographs on the communication device is used as a device-specific parameter and it is assumed that the number of photographs will typically increase at a fairly steady rate. When a first message from the communication device is sent to the remote server, the communication device may retrieve information regarding the number of photographs and this number may be saved at the remote server. The communication device may continuously obtained and transmit the number of photographs, in subsequent communications between the device and the remote server, and the communications will be accepted as long as the number of photographs increase at the steady rate. Alternatively, the number of photographs may also be retrieved from a third party server in the form of an application server for a photograph sharing application. If the number of photographs decreases or changes by an unlikely amount, it is likely that it is not the correct device that is sending the communication and that the accompanying fingerprint may have been created by a hacker.

Figure 4:
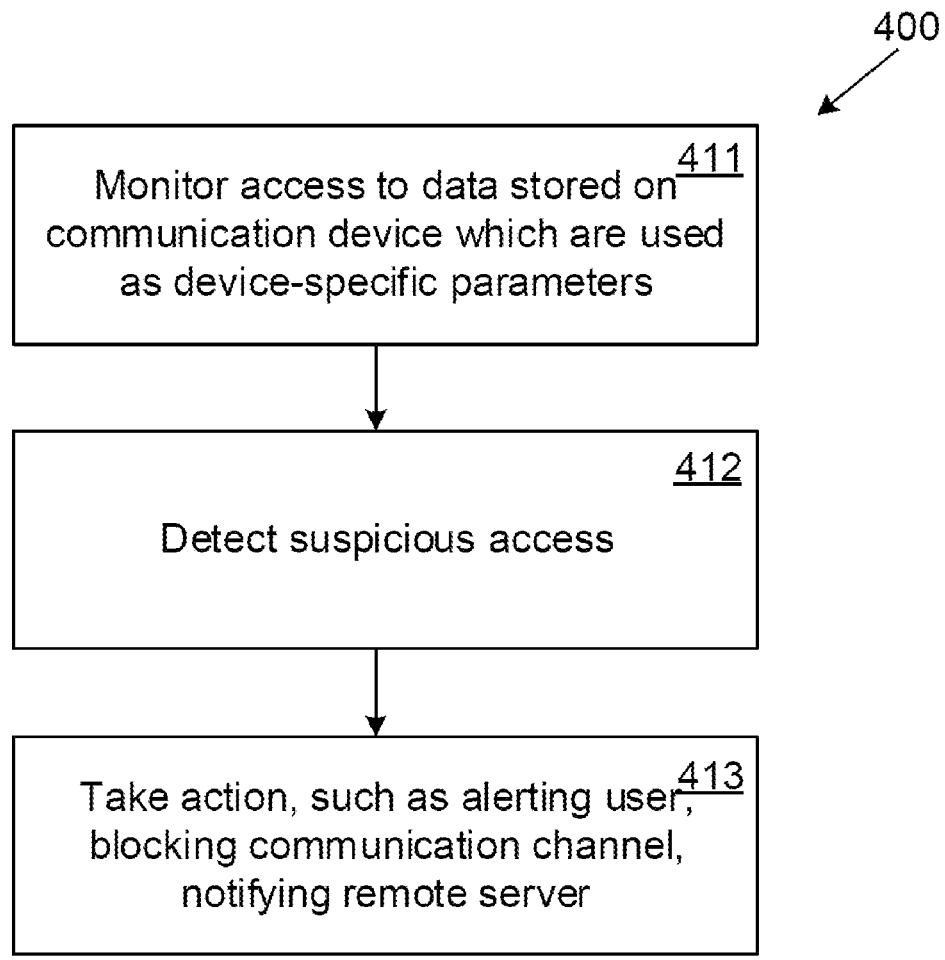
FIG. 4 is a flow diagram showing a method at a communication device according to a further aspect of the present invention.

Referring to FIG. 4, a flow diagram (400) shows an embodiment of a further aspect of the described method of prevention of malicious use of a communication device (110).

The communication device (110) may monitor (411) access to data stored on the communication device and other parameters of the device which are used as device-specific parameters in the authentication method. This monitoring may be carried out by the operating system of the communication device or as part of the authentication application operating on the communication device. Any access which is not from a legitimate source, such as the authentication application, may be detected.

If suspicious access is detected (412), action (413) may be taken in the form of issuing an alert to the user, blocking a communication channel, or sending a message to the remote server (120) to block a service for the communication device's identification number.

When installing an authentication application on a communication device, the communication device may alert the user that the application will be accessing the parameter values from the communication device. An alert may also be provided at the first use of the application and access to the parameter values. Thereafter, the installed application may be allowed to access the parameter values; however, access by other applications which may not be genuine, will trigger an alert.

Figure 5:
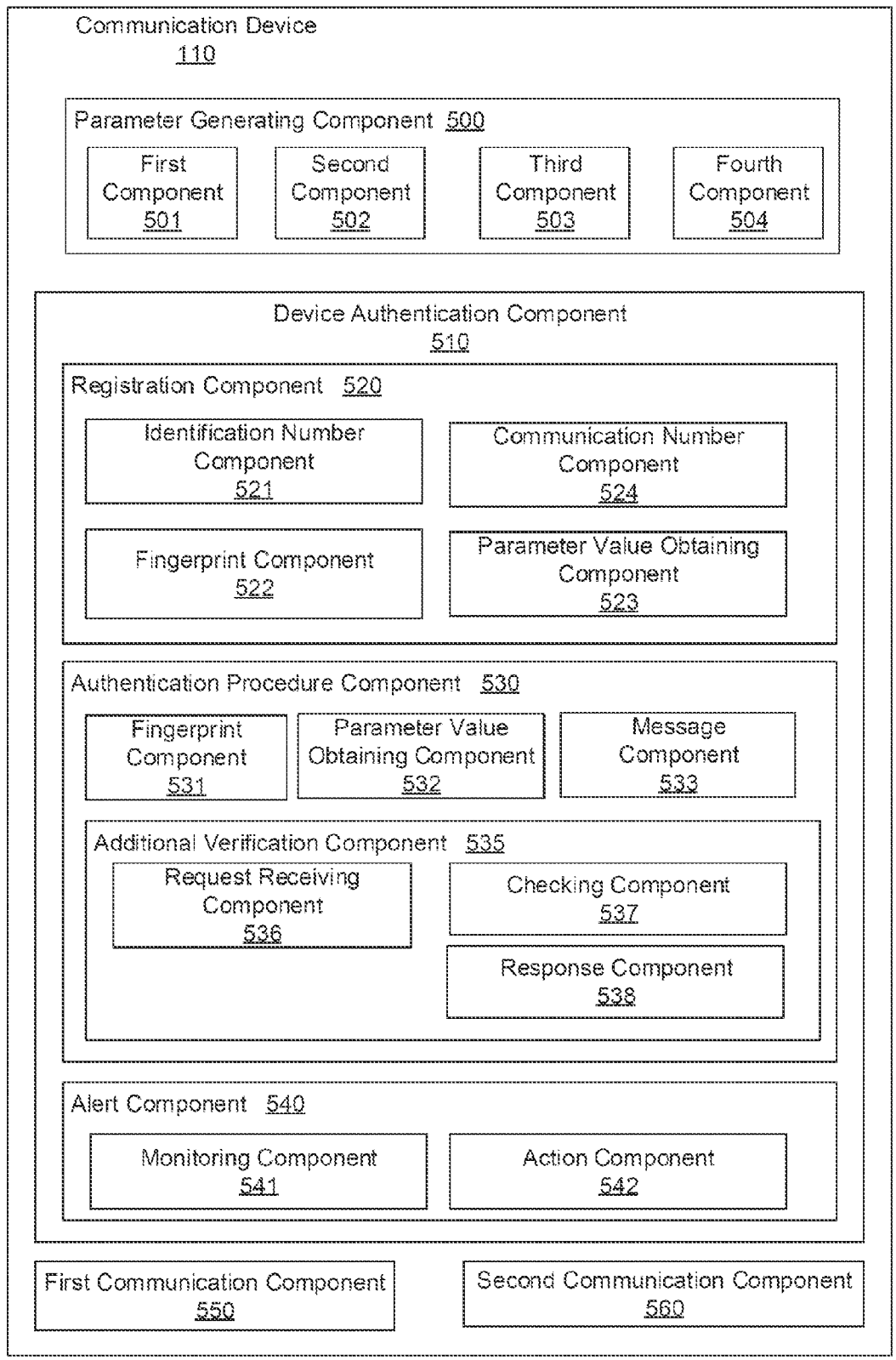
FIG. 5 is a block diagram of a communication device in accordance with an aspect of the present invention.

Referring to FIG. 5, a block diagram shows an example embodiment of a communication device (110) having a parameter generating component (500), a device authentication component (510) for authenticating the identity of the communication device (110) in addition to first and second communication components (550, 560) for communication with a remote server (120) via first and second communication channels.

The parameter generating component (500) may include a first component (501) for generating the number of emails on or in an inbox on the device, a second component (502) for generating the number of photographs on the device, a third component for generating the number of applications installed on the device and a fourth component for generating the memory used or the memory remaining on the device.

The authentication component (510) may include a registration component (520), an authentication procedure component (530), and an alert component (540).

The registration component (520) may include an identification number component (521) for providing an identification number of the communication device (110) during a registration procedure. The registration component (520) may also include a communication number component (524) for providing a communication number of the communication device (110) during the registration procedure. The registration component (520) may include a fingerprint component (522) for setting up a fingerprint identification algorithm. The registration component (520) may also include a parameter value obtaining component (523) for obtaining the at least one device-specific parameter value from the parameter generating component (500).

The authentication procedure component (530) may include a fingerprint component (531) for obtaining a fingerprint of the communication device (110) including a communication device identification number. The authentication procedure component (530) may also include a parameter value obtaining component (532) for obtaining the at least one device-specific parameter value from the parameter generating component (500) during the authentication procedure. The authentication procedure component (530) may further include a message component (533) for compiling a message including the fingerprint and the at least one parameter value for sending via the first communication channel.

The authentication procedure component (530) may include a sub-component of an additional verification component (535) including a request receiving component (536) for receiving an out of band additional verification request via the second communication channel. The additional verification component (535) may include a checking component (537) for checking that an authentication procedure is currently underway from the authentication procedure component (530) of the communication device (110). The additional verification component (535) may also include a response component (538) for providing a response to the remote server (120).

The alert component (540) may include a monitoring component (541) for monitoring access to the device-specific parameters in order to detect any suspicious access to this data. The alert component (540) may include an action component (542) providing a responsive action, such as an alert to the user, an alert to the remote server, a termination of the service request, or termination of a communication channel.

Figure 6:
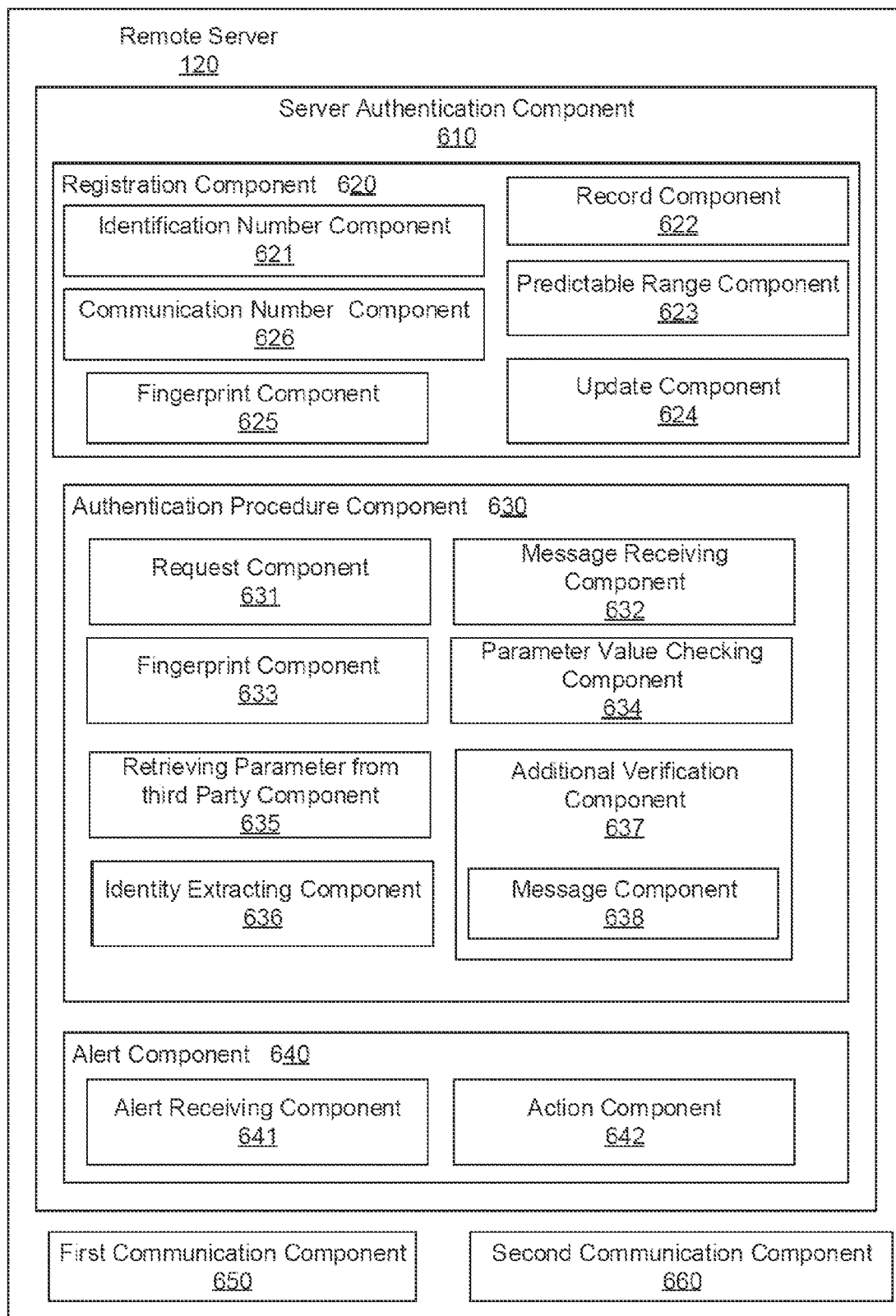
FIG. 6 is a block diagram of a remote server in accordance with an aspect of the present invention.

Referring to FIG. 6, a block diagram shows an example embodiment of a remote server (120) having a server authentication component (610) for authenticating the identity of a communication device (110).

The authentication component (610) may include a registration component (620), an authentication procedure component (630), and an alert component (640) in addition to first and second communication components (650, 660) for communication with a communication device (110) via first and second communication channels.

The registration component (620) may include an identification number component (621) for registering details of the identification number of the communication device.

The registration component (620) may also include a communication number component (626) for obtaining a communication number from the communication device (110). This may be the MSISDN for the communication device (110) which may be obtained automatically by the remote server (120) via an USSD message. Alternatively, the identification number may be a telephone number for the communication device (110) provided during the registration procedure.

The registration component (620) may include a fingerprint component (625) for registering an identification fingerprint algorithm to use with the communication device (110) being registered.

The registration component (620) may also include a record component (622) for recording at least one parameter value as supplied by the communication device (110), a predictable range component (623) for calculating a predictable range of a value for a given time frame since the value was provided, and an update component (624) for updating the parameter values and predictable ranges when an updated parameter is received during an authentication procedure.

The authentication procedure component (630) may include a request component (631) for requesting authentication of a communication device (110), and a message receiving component (632) for receiving and extracting information from a message received on the first communication channel. A fingerprint component (633) may decode a received fingerprint to obtain an identification number of the communication device (110). A parameter value checking component (634) may be provided for checking a received at least one parameter value against the predicted range for this value for the identified communication device (110) calculated by the registration component (620). A retrieving parameter from third party component (635), for optionally retrieving the at least one parameter value from a third party server (150) and an identity extracting component (636) may be provided for extracting the identity of the communication device (110).

The authentication procedure component (630) may include an additional verification component (637) including a message component (638) with a code generating component which is sent via a second communication channel to the communication device (110) in the event that the parameter values are not accepted or for use during an initial period in which the predicted range is being learnt.

The alert component (640) may include an alert receiving component (641) and an action component (642) for discontinuing a channel or service on receipt of an alert.

Figure 7:
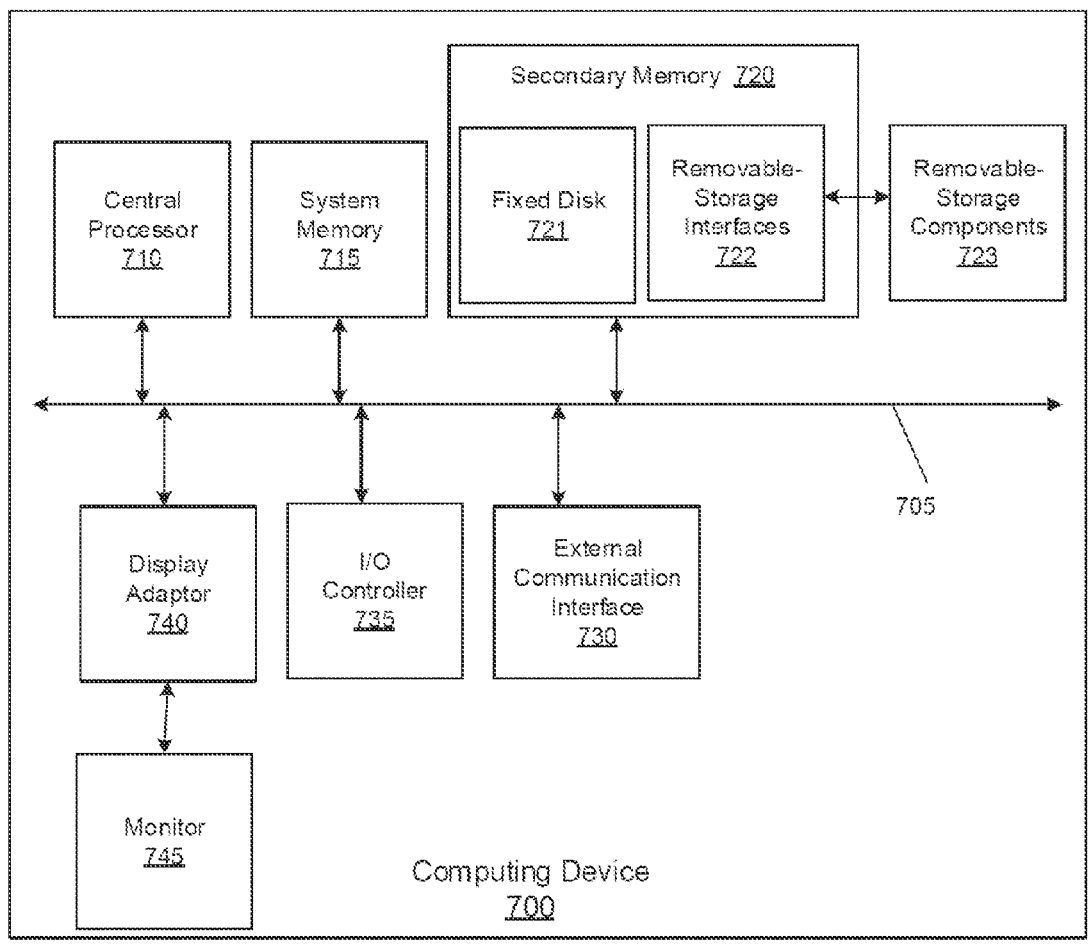
FIG. 7 is a block diagram of a computing device that can be used in various embodiments of the present invention.

FIG. 7 illustrates an example of a computing device (700) in which various aspects of the disclosure may be implemented, for example, the remote server. The computing device (700) may be suitable for storing and executing computer program code. The various participants and elements in the previously described system diagrams may use any suitable number of subsystems or components of the computing device (700) to facilitate the functions described herein.

The computing device (700) may include subsystems or components interconnected via a communication infrastructure (705) (for example, a communications bus, a cross-over bar device, or a network). The computing device (700) may include at least one central processor (710) and at least one memory component in the form of computer-readable media.

The memory components may include system memory (715), which may include read only memory (ROM) and random access memory (RAM). A basic input/output system (BIOS) may be stored in ROM. System software may be stored in the system memory (715) including operating system software.

The memory components may also include secondary memory (720). The secondary memory (720) may include a fixed disk (721), such as a hard disk drive, and, optionally, one or more removable-storage interfaces (722) for removable-storage components (723).

The removable-storage interfaces (722) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (722) may also be in the form of ports or sockets for interfacing with other forms of removable-storage components (723) such as a flash memory drive, external hard drive, or removable memory chip, etc.

The computing device (700) may include an external communications interface (730) for operation of the computing device (700) in a networked environment enabling transfer of data between multiple computing devices (700). Data transferred via the external communications interface (730) may be in the form of signals, which may be electronic, electromagnetic, optical, radio, or other types of signal.

The external communications interface (730) may enable communication of data between the computing device (700) and other computing devices including servers and external storage facilities. Web services may be accessible by the computing device (700) via the communications interface (730).

The external communications interface (730) may also enable other forms of communication to and from the computing device (700) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (710).

A computer program product may be provided by a non-transient computer-readable medium, or may be provided via a signal or other transient means via the communications interface (730).

Interconnection via the communication infrastructure (705) allows a central processor (710) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (700) either directly or via an I/O controller (735). These components may be connected to the computing device (700) by any number of means known in the art, such as a serial port.

One or more monitors (745) may be coupled via a display or video adapter (740) to the computing device (700).

Figure 8:
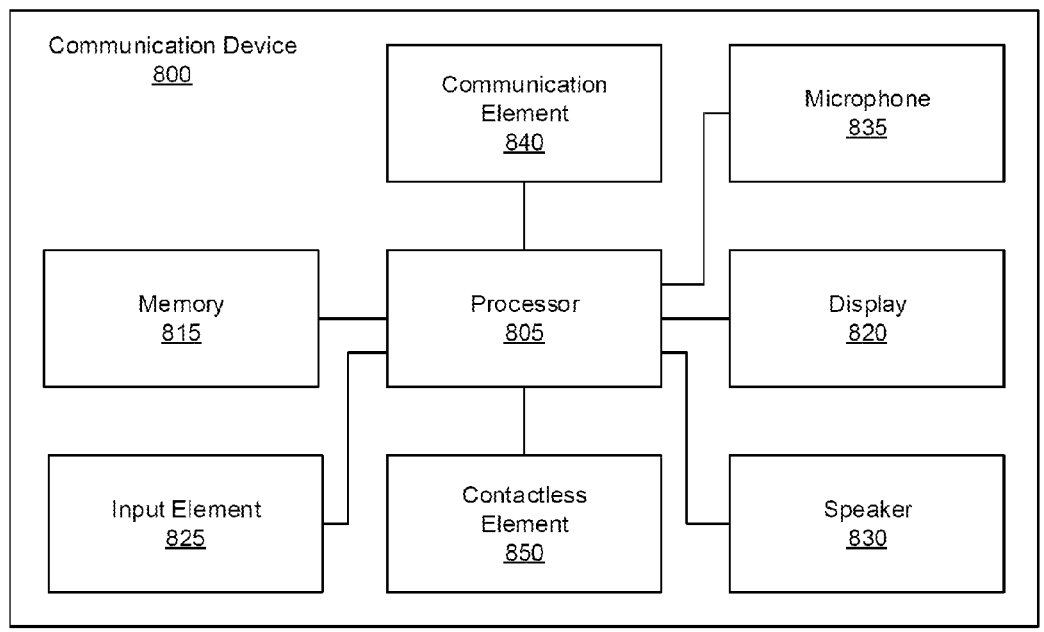
FIG. 8 is a block diagram of a communication device that can be used in various embodiments of the present invention.

FIG. 8 shows a block diagram of a communication device (800) that may be used in embodiments of the disclosure. The communication device (800) may be a cell phone, a feature phone, a smart phone, a satellite phone, or a computing device having a phone capability.

The communication device (800) may include a processor (805) (e.g., a microprocessor) for processing the functions of the communication device (800) and a display (820) to allow a user to see the phone numbers and other information and messages. The communication device (800) may further include an input element (825) to allow a user to input information into the device (e.g., input buttons, touch screen, etc.), a speaker (830) to allow the user to hear voice communication, music, etc., and a microphone (835) to allow the user to transmit his or her voice through the communication device (800).

The processor (810) of the communication device (800) may connect to a memory (815). The memory (815) may be in the form of a computer-readable medium that stores data and, optionally, computer-executable instructions.

The communication device (800) may also include a communication element (840) for connection to communication channels (e.g., a cellular telephone network, data transmission network, Wi-Fi network, satellite-phone network, Internet network, Satellite Internet Network, etc.). The communication element (840) may include an associated wireless transfer element, such as an antenna.

The communication element (840) may include a subscriber identity module (SIM) in the form of an integrated circuit that stores an international mobile subscriber identity and the related key used to identify and authenticate a subscriber using the communication device (800). One or more subscriber identity modules may be removable from the communication device (800) or embedded in the communication device (800).

The communication device (800) may further include a contactless element (850), which is typically implemented in the form of a semiconductor chip (or other data storage element) with an associated wireless transfer element, such as an antenna. The contactless element (850) may be associated with (e.g., embedded within) the communication device (800) and data or control instructions transmitted via a cellular network may be applied to the contactless element (850) by means of a contactless element interface (not shown). The contactless element interface may function to permit the exchange of data and/or control instructions between mobile device circuitry (and hence the cellular network) and the contactless element (850).

The contactless element (850) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infrared, or other data transfer capability that can be used to exchange data between the communication device (800) and an interrogation device. Thus, the communication device (800) may be capable of communicating and transferring data and/or control instructions via both a cellular network and near field communications capability.

The data stored in the memory (815) may include: operation data relating to the operation of the communication device (800), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (800) to selected receivers.

The communication device (800) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for authenticating a communication device requesting access to a service or data, the method being conducted at a remote server and comprising the steps of:
    receiving from a communication device via a first communication channel:
        a device fingerprint derived from at least a device hardware identifier identifying the communication device; and
        in addition to the device fingerprint, a value derived from a device-specific usage parameter representing a current usage of the communication device, wherein the device-specific usage parameter varies over time at a predictable rate, and the device-specific usage parameter is obtained from usage data on the communication device;
    extracting the identity of the communication device and obtaining a predicted range of the value of the device-specific usage parameter for the identified communication device at the time of receipt of the value;
    determining whether the received value is within the predicted range;
    if the value is within the predicted range, authorizing the communication device to access the requested service or the requested data; and
    if the value is not within the predicted range or the predicted range has not been established, sending an additional authentication request to the identified communication device via a second communication channel.

2. The method as claimed in claim 1, wherein the predicted range is learnt over a given number of interactions between the communication device and the remote server and an expected rate of change of the value is established.

3. The method as claimed in claim 1, wherein the predicted range is obtained from a third party server which stores a corresponding parameter to the device-specific usage parameter of the communication device.

4. The method as claimed in claim 1, wherein sending an additional authentication request includes:
    transmitting a code to the communication device over the second communication channel using a communication number obtained during a registration procedure of the communication device;
    receiving the code from the communication device; and
    authenticating the communication device.

5. The method as claimed in claim 4, wherein the additional authentication request includes a header for identifying the additional authentication request at the communication device for automatic processing.

6. The method as claimed in claim 1, wherein more than one value is received from the communication device and the method including:
    determining whether each value is within a predicted range for that value; and
    if a predefined number of the values are within their predicted ranges, authenticating the communication device.

7. The method as claimed in claim 1, wherein the device fingerprint identifying the communication device is generated by an algorithm known to the communication device and the remote server which incorporates an identification number of the communication device.

8. The method as claimed in claim 1, including a registration procedure comprising the steps of:
    obtaining a communication number for the communication device;
    recording an identification number for the communication device and a device fingerprinting method; and
    receiving at least one current value of a parameter and a timestamp for the value.

9. A method for authenticating a communication device requesting access to a service or data, the method being conducted at a communication device and comprising the steps of:
    retrieving a value derived from a device-specific usage parameter representing usage of the communication device at a given time, wherein the device-specific usage parameter varies over time at a predictable rate, and the device-specific usage parameter is obtained from a component of the communication device; and
    sending to a remote server via a first communication channel:
        a device fingerprint derived from at least a device hardware identifier identifying the communication device; and
        the value of the device-specific usage parameter at the given time,
    wherein the remote server determines whether the value is within a predicted range, and if the value is within the predicted range, the communication device is authorized to access the requested service or the requested data, and if the value is not within the predicted range or the predicted range has not been established, the communication device receives an additional authentication request at the communication device via a second communication channel.

10. The method as claimed in claim 9, including retrieving and sending a value of more than one device-specific usage parameter.

11. The method as claimed in claim 9, including:
receiving an additional authentication request and determining if an authentication procedure is in progress in the communication device; and
if an authentication procedure is in progress, returning a response to the additional authentication request to the remote server.

12. The method as claimed in claim 11, including:
identifying a header in an additional authentication request and automatically processing the additional authentication request.

13. The method as claimed in claim 9, including:
monitoring access to the device-specific usage parameter of the communication device used for deriving the value;
detecting any suspicious access; and
taking an action.

14. A system for authenticating a communication device requesting access to a service or data, the system comprising a remote server including:
an authentication procedure component including:
a receiving component for receiving, from a communication device via a first communication channel:
a device fingerprint derived from at least a device hardware identifier identifying the communication device; and
a value derived from a device-specific usage parameter representing a current usage of the communication device, wherein the device-specific usage parameter varies over time at a predictable rate, and the device-specific usage parameter is obtained from usage data on the communication device;
an identity extracting component for extracting the identity of the communication device and obtaining a predicted range of the value of the device-specific usage parameter for the identified communication device at the time of receipt of the value;
a parameter value checking component for determining whether the received value is within the predicted range, wherein the communication device is authorized to access the requested service or the requested data if the value is within the predicted range; and
an additional verification component for sending an additional authentication request to the identified communication device via a second communication channel if the value is not within the predicted range or the predicted range has not been established.

15. The system as claimed in claim 14, wherein the predicted range is learnt by a predictable range component over a given number of interactions between the communication device and the remote server and an expected rate of change of the value is established.

16. The system as claimed in claim 14, wherein a retrieving parameter component obtains the predicted range from a third party server which stores a corresponding parameter to the device-specific usage parameter of the communication device.

17. The system as claimed in claim 14, wherein the additional verification component includes a message component for sending an additional authentication request including a code to the communication device over the second communication channel using a communication number obtained during a registration procedure of the communication device, and receiving the code from the communication device.

18. The system as claimed in claim 14, wherein the authentication procedure component includes:
a device fingerprint component for generating a device fingerprint by an algorithm known to the communication device and the remote server which incorporates an identification number of the communication device.

19. The system as claimed in claim 14, wherein the remote server includes a registration component including:
a communication number component for obtaining a communication number for the communication device;
a record component for recording an identification number for the communication device and a device fingerprinting method and receiving at least one current value of the device-specific usage parameter and a timestamp for the value.

20. A system for authenticating a communication device requesting access to a service or data, the system comprising a communication device including:
an authentication procedure component including:
a parameter value obtaining component for retrieving a value derived from a device-specific usage parameter representing usage of the communication device at a given time, wherein the device-specific usage parameter varies over time at a predictable rate, and the device-specific usage parameter is obtained from a component of the communication device; and
a message component for sending to a remote server via a first communication channel:
a device fingerprint derived from at least a device hardware identifier identifying the communication device; and
the value of the parameter device-specific usage at the given time,
wherein the remote server determines whether the value is within a predicted range, and if the value is within the predicted range, the communication device is authorized to access the requested service or the requested data, and if the value is not within the predicted range or the predicted range has not been established, the communication device receives an additional authentication request at the communication device via a second communication channel.

21. The system as claimed in claim 20, wherein the parameter value obtaining component retrieves and sends a value of more than one device-specific usage parameter.

22. The system as claimed in claim 20, including:
an additional authentication component for receiving an additional authentication request and determining if an authentication procedure is in progress in the communication device, wherein if an authentication procedure is in progress, a response is returned to the additional authentication request to the remote server.

23. The system as claimed in claim 20, including:
an alert component having:
- a monitoring component for monitoring access to the device-specific usage parameter of the communication device used for deriving the value and detecting any suspicious access; and
- an action component for taking an action.

* * * * *